United States Patent [19]

Dotzauer et al.

[11] Patent Number: 5,145,625
[45] Date of Patent: Sep. 8, 1992

[54] METHOD OF PREPARING SHAPED ARTICLES FROM A MINERAL AGGREGATE AND A POLYACRYLATE BINDER

[75] Inventors: Bernhard Dotzauer, Maxdorf; Wilhelm F. Beckerle, Bobenheim-Roxheim; Hans-Juergen Denu, Deidesheim; Kurt Wendel; Manfred Schwartz, both of Ludwigshafen, all of Fed. Rep. of Germany

[73] Assignee: BASF Aktiengesellschaft, Ludwigshafen, Fed. Rep. of Germany

[21] Appl. No.: 714,346

[22] Filed: Jun. 12, 1991

Related U.S. Application Data

[63] Continuation of Ser. No. 417,468, Oct. 5, 1989, abandoned.

[30] Foreign Application Priority Data

Oct. 26, 1988 [DE]  Fed. Rep. of Germany ....... 3836433

[51] Int. Cl.$^5$ .......................... D21J 1/06; D04H 1/12
[52] U.S. Cl. .................... 264/109; 162/168.3; 252/609; 264/122; 264/331.18; 264/Dig. 19; 264/87
[58] Field of Search ............... 264/109, 122, 128, 115, 264/116, 121, 331.18, DIG. 19, 87; 162/168.3; 523/411, 412; 252/609; 524/108

[56] References Cited

U.S. PATENT DOCUMENTS

| | | | |
|---|---|---|---|
| 2,931,749 | 4/1960 | Kine et al. | 264/109 |
| 3,012,911 | 12/1961 | Moser | 264/128 |
| 3,015,595 | 1/1962 | Moser et al. | 264/128 |
| 3,057,812 | 10/1962 | Straughan et al. | 523/411 |
| 3,554,856 | 1/1971 | Opferkuch, Jr. et al. | 264/109 |
| 3,740,367 | 6/1973 | Winkelblech | 524/108 |
| 4,187,142 | 2/1980 | Picklman et al. | 162/168.3 |
| 4,189,345 | 2/1980 | Foster et al. | 162/168.3 |

OTHER PUBLICATIONS

Hackh's Chemical Dictionary, McGraw Hill, 1969, pp. 221 and 624.

*Primary Examiner*—Jeffery Thurlow
*Assistant Examiner*—Mathieu Vargot
*Attorney, Agent, or Firm*—Oblon, Spivak, McClelland, Maier & Neustadt

[57] ABSTRACT

Shaped articles are produced from a finely particulate material as aggregate and an aqueous binder preparation containing an acrylate polymer by moistening the aggregate with the binder preparation, making it into the desired shape and then drying it, using a binder preparation whose binder is an acrylate polymer whose glass transition range is relatively high and which is formed from (A) a predominant amount of methyl methacrylate, (B) a minor amount of (meth) acrylic acid, (C) a minor amount of an optional alkyl acrylate and (D) a small optional amount of another specific polymerizable compound.

5 Claims, No Drawings

METHOD OF PREPARING SHAPED ARTICLES FROM A MINERAL AGGREGATE AND A POLYACRYLATE BINDER

This application is a continuation of application Ser. No. 07/417,468, filed on Oct. 5, 1989, now abandoned.

BACKGROUND OF THE INVENTION

The present invention relates to a process for preparing a shaped article from a finely particulate, granular or fibrous material as aggregate and an aqueous binder preparation which contains an acrylate polymer, wherein the aggregate is moistened with the binder preparation, made into the desired shape and then dried with or without heating.

Processes of this kind are known in a number of versions, for example from U.S. Pat. Nos 4,189,345 and 4,187,142 and from German Laid-Open application DOS 2,924,085.

The documents mentioned describe a general process wherein the aggregates are drained on a wire together with the binder, which may be a precipitate, in a sheet formation step and then dried at elevated temperature.

In this way it is possible to use for example kaolin, mineral fibers and starches to produce ceiling panels. The serious disadvantage of such basically very stiff panels is that they lose their shape in a moist room, in particular in moist and warm rooms, i.e. under tropical conditions, and sag under their own weight. Such sagging ceilings have an unattractive appearance and therefore are undesirable. A further disadvantage of such sheetlike structures is their sensitivity to microbial degredation of the starch binder, which is apparent from dark spots and the loss of mechanical strength. It is of course possible to make these panels microbicidal, for example by incorporation of formaldehyde depot materials. They ensure a gradual release of formaldehyde and give some protection against infestation. However, for protection to last any length of time it is necessary for the levels of preservative to be comparatively high, which can lead to odor nuisance and in certain circumstances to allergic reactions on the part of the inhabitants.

Other, repeatedly proven production techniques consist in moistening more or less well-ordered, usually fibrous aggregates by spraying or dipping with subsequent squeezing off and finally drying at elevated temperature under more or less compressive force to adjust the density of the sheetlike structure.

It is finally necessary to mention the generally known process for the production of chipboard, wherein the chips are sprayed with aqueous solutions usually of urea-formaldehyde condensates, and cured under pressure and temperature.

Granular aggregates are moistened with the binder preparation, the mixtures are introduced into molds, and the water is removed, usually after demolding.

As indicated, the preferred binder preparations of the prior art are almost exclusively aqueous solutions of condensation products based on phenol, melamine and-/or urea with formaldehyde. Although these binders have been in use for decades, it is comparatively recently that their serious disadvantages came to light. For instance, they always contain minor amounts of starting materials, e.g. phenol and/or formaldehyde, which in the course of processing are partially emitted into the air at the workplace. This fact increasingly necessitates better ventilation of production sites. Unfortunately, in this way the compounds also pass into the atmosphere, which in turn necessitates further measures. In addition, starting materials are still present in ready-produced shaped articles and thus may end up in trace amounts in the air in the home and in the office and even in the car. Finally, these impurities cause problems with the disposal of waste as landfill if the shaped articles contain phenolic resins.

SUMMARY OF THE INVENTION

It is an object of the present invention to provide a process of the type defined above for obtaining shaped articles which are free, or are substantially free, of the abovementioned disadvantages.

We have found that this object is achieved by using in the process defined at the beginning a binder preparation whose binder is an acrylate polymer whose glass transition temperature is not less than 60° C. and which is formed from (A) 60-95% by weight of methyl methacrylate,
(B) 40-5% by weight of (meth)acrylic acid,
(C) 0-40% by weight of a $C_1$-$C_8$-alkyl acrylate and
(D) 0-5% by weight of another polymerizable compound.

DETAILED DESCRIPTION OF THE INVENTION

The present invention accordingly provides a process for producing a shaped article from a finely particulate, granular or fibrous material as aggregate and an aqueous binder preparation which contains an acrylate polymer, in which the aggregate is moistened with the binder preparation, made into the desired shape and then dried with or without heating, which comprises using a binder preparation whose binder is an acrylate polymer whose glass transition temperature is not less than 60° C., preferably 80°-120° C., or even as high as 150° C., and which is formed from (A) 60-95, preferably 65-85, % by weight of methyl methacrylate,
(B) 40-5, preferably 10-30, % by weight of (meth)acrylic acid,
(C) 0-40, preferably 0-20, % by weight of a $C_1$-$C_8$-alkyl acrylate, preferably $C_1$-$C_4$-alkyl acrylate, and
(D) 0-5% by weight of another specific copolymerizable compound, such as a crosslinking agent or the like.

Surprisingly, in the process according to the invention, the abovementioned disadvantageous properties of similar existing processes can be avoided by using the specific methyl methacrylate polymer defined above. Although it is a thermoplastic, it performs as a constituent of a shaped article all the binding functions of thermosetting resins, such as stiffness. Another surprise is that this hydrophilic polymer ensures that the shaped article stays stiff even in a moist and warm atmosphere.

Another positive aspect is that this polymer is easy to prepare by emulsion polymerization. Owing to its very low residual monomer content, the polymer is largely odorless and physiologically safe. There is no need to incorporate a preservative in the shaped article, since the polymer is not degradable under these conditions. Nevertheless, the disposal of binder residues and even of shaped articles produced therewith does not present any problems. The polymer combines with multivalent ions such as calcium, magnesium or iron(III) ions to form water-insoluble compounds and thus cannot pass into the ground-water. The calcium compounds become very strongly adsorbed to the solids particles of water treatment plants. Another advantage is that this polymer is composed only of carbon, hydrogen and oxygen.

The novel process as such may be carried out in a conventional manner since the core of the invention is not the process as such but the above-defined binder preparation used in the process.

Instead of making detailed observations concerning the practice of the process according to the invention, it is therefore possible to cite relevant publications, for example those mentioned at the beginning.

It is only necessary to add the following remarks:

The polymer dispersion or solution according to the present invention permits wide variation in respect of the process for producing a shaped article.

In preparing a sheetlike structure, sheet formation may be carried out on a wire and the sheet may be dried at elevated temperature (about 90° C. or higher). It is also possible to follow the sheet formation step by a shaping step and only then to dry at elevated temperature.

It is further possible to mix all the aggregate in the dry or moist state, in a fluidized bed and then to shape the mixture and dry it, preferably by heating.

An advantage of the processing technique is the low residual monomer content of the polymer to be used according to the invention, which is usually distinctly below 500 ppm, based on the dispersion or solution. Consequently, the concentration in the air at the workplace is remarkably low and the ready-produced article is virtually odorless.

The binder preparation according to the present invention can be used in particular for producing shaped articles from mineral fibers, for example rock wool, basalt wool and/or glass fibers usually from 0.2 to 8, in particular from 0.5 to 5, cam in length and from about 1.7 to 3.3 dtex in linear density, and also fire-dried sands or wood as aggregates; they are therefore very suitable for example for producing mineral fiberboard (acoustic board), mineral fiber mats, molds for the casting of metals or wood fiber moldings for automobile construction.

In accordance with the prior art, the stiff mineral fiber board, from about 1 to 3 cm in thickness, may contain fillers, such as finely divided clays, for example kaolin and montmorillonite, feldspar, chalk, kieselguhr and/or mica, the amount of which is up to 30%, based on mineral fibers, preferably 10–20%.

In addition, the mineral fiber board, which in general has a very favorable fire rating, may contain up to 10, preferably 1–3, % by weight, based on mineral fiber, of customary fireproofing agents, for example aluminum silicates and hydroxides, borates and/or phosphates.

Finally, the mineral fiber board usually contains in addition up to 5, preferably 1–2, % by weight, based on mineral fiber, of customary waterproofing agents such as silicones (polysiloxanes) and/or waxes.

The novel mineral fiber board may be provided on its visible surface with known sound-absorbing structures and in a conventional manner with decorative coatings. The resulting sound insulation (ceiling) panels have very good acoustic insulation characteristics, are very stiff, even in the moist state, and release the absorbed moisture very easily.

As explained above, the core of the present invention is the use of a specific aqueous binder preparation in the process defined at the beginning. This binder preparation can be an aqueous solution or dispersion of the specific acrylate polymer. It is likewise known per se, for example from U.S. Pat. Nos. 3,740,367 and 3,057,812.

For the purposes of the present invention it is important that the acrylate polymer used has a glass transition range from 60° C. to 150° C. It may be mentioned in this context that the glass transition temperature can be determined by conventional methods, for example by measuring the modulus of elasticity in a strain test as a function of temperature or by differential thermal analysis (DTA) (see A. Zosel, Farbeund Lack 82 (1976), 125–134).

As we have found, a particularly suitable binder preparation for the purposes of the present invention is a 10–25, preferably 15–20, % strength by weight aqueous solution of a polymer from (A) 60–75% by weight of methyl methacrylate, (B) 25–35% by weight of methacrylic acid, (C) 0–20% by weight of a $C_1$–$C_4$-alkyl acrylate, in particular methyl acrylate, ethyl acrylate, n-butyl acrylate or tert-butyl acrylate, and (D) 0–1% by weight of a specific copolymerizable compound, such as divinylbenzene, butanediol di(meth)acrylate or diallyl phthalate.

A polymer solution is prepared by adding ammonia to a polymer dispersion obtained by emulsion polymerization, preferably in the presence of 0.1–3% by weight, based on the polymer, of an anionic emulsifying agent, for example a $C_{12}$–$C_{14}$-alkanesulfonate.

The solution may advantageously be adjusted with ammonia to a pH of not less than 7, preferably a pH of 7.5–8.5. It is usually a clear, viscous liquid, but it may also be cloudy, which has no effect on its utility as a binder.

As was also found, a particularly suitable binder preparation for the purposes of the present invention is a 20–50, in particular a 30–40, % strength by weight aqueous dispersion of a polymer formed from (A) 60–80, in particular 60–70, % by weight of methyl methacylate, (B) 10–20, in particular 10–15, % by weight of methacrylic acid, (C) 10–30, in particular 10–20, % by weight of a $C_1$–$C_4$-alkyl acrylate, namely methyl acrylate, ethyl acrylate, n-butyl acrylate or tert-butyl acrylate, and (D) 0–2.5% by weight of a specific copolymerizable compound, such as divinylbenzene, butanediol di(meth)acrylate and/or diallyl phthalate.

The pH of the polymer dispersion is within the range from 3 to 7, preferably from 4 to 6. The polymer dispersion usually has a lower viscosity. The average particle size is within the range 100–300 $\mu$m and preferably is 200 $\mu$m ($D_{50}$, ultracentrifuge, W. Maechtle, Makromolekulare Chemie 185 (1984), 1025).

The following remarks concern specifically the binder preparation to be used according to the present invention:

To produce (stiff) mineral fiber board for acoustic purposes it is particularly advantageous to use as binder preparation a solution of polymer formed from about 70% by weight of methyl methacrylate and 30% by weight of methacrylic acid in the form of an ammonium salt.

By contrast, if (flexible) mineral fiber thermal insulation mats are to be produced, it is advantageous to use a dispersion of the polymer formed from about 65% by weight of methyl methacrylate, 25% by weight of n- butyl acrylate and 10% by weight of methacrylic acid. By including a commercial adhesion promoter, for example about 1% of aminoethylaminopropyltrimethoxysilane, it is possible to increase the strength of the bond.

To produce wood moldings for use in automotive vehicles, better results are obtained with polymer dispersions than with polymer solutions.

The aggregate to be used in the process of the present invention can be of the customary type; it is of advantage here for the binder preparation to be used according to the present invention to show very good adhesion to very different materials. Suitable aggregates in the present context are thus for example mineral and/or glass fibers, fire-dried sands, clays and also comminuted and/or digested (pine) wood. In the last case, the inclusion of natural and/or synthetic fibers may produce further benefits.

As part of the Examples described below, the following test methods are used:

Density of Mineral Fiber Board

Cutting out of test specimens to size 250 mm × 50 mm. The thickness is determined with a vernier and used to calculate the volume. Calculation of the density in $g/cm^3$, average based on 2 specimens.

Density of Wood Fiber Board

Circular specimens 9 mm in diameter are stamped out by means of a stamping iron. Thickness measured with a vernier to calculate the volume and to calculate the density in $g/cm^3$. Average based on 3 specimens.

Water Absorption

Specimens 250 mm × 50 mm in size are stored under a weight in water at room temperature for 1 or 2 hours. Weight increase measured by weighing after careful sponging off. Each average based on 2 specimens, in percent of weight increase.

Dimensional Stability (Measure of the Stiffness)

Test specimens 250 mm × 50 mm in size are ground down with a belt sander on the side remote from the wire in sheet formation until 15 mm thin.

The test specimens thus obtained are stored flat in a horizontal position supported at the edges in an atmosphere 38° C. and 95% relative humidity and are weighted down in the middle with a 1 kg weight, so that the load acts on the entire length of the specimen. The sag of the test specimen after the weight has been removed is measured as an indication of the long-term characteristics of mineral fiber board.

Strength

The cured test specimens (size 17 cm × 2 cm × 2 cm) formed from core sand and binder are supported close to the edges and subjected in the center to a continuously increasing force, so that the load acts on the entire length of test specimen. The applied force at the instance of break is reported as an average based on five test specimens in $kg/cm^2$.

Tensile Strength

The tensile strength is determined in accordance with German Standard Specification DIN 53 455.

Loss on Ignition

Loss on ignition is determined in line with German Standard Specification DIN 52 911.

EXAMPLE 1

250 g of mineral wool and 100 g of kaolin are dispersed with thorough stirring in 3 l of water containing 2,000 g of a 10% strength aqueous solution, adjusted to pH 8 with ammonia, of a binder polymer formed from 70 parts by weight of methyl methacrylate, 25 parts by weight of methacrylic acid and 5 parts by weight of acrylic acid. Once a homogeneous fiber mass has formed (after about 2-4 minutes of stirring), 5 g of a 10% strength aqueous solution of a copolymer of 70 parts by weight of acrylamide and 30 parts by weight of diethylaminodiethyl acrylate are added to effect flocculation. Thereafter 5 g of a 46% strength silicone emulsion are dispersed in the flocculated fiber mass, and the mixture is poured into a sieve box (sieve area 25 cm × 25 cm) and is uniformly distributed therein with a wooden spatula. The fiber mass is dewatered under a slightly reduced pressure. A sieve plate (25 cm × 25 cm) is placed on top under a slight pressure (less than 0.1 bar) while a slightly reduced pressure is maintained to obtain moist raw panels which on average are about 18 mm in thickness and have a water content of about 40-80%. The filtrate can be reused for a subsequent experiment. Drying on siliconized paper in a through-circulation cabinet at 180° C.

| | |
|---|---|
| Binder content (loss on ignition) | 5.9% |
| Density | 0.27 $g/cm^3$ |
| Water uptake after 1 h | 9% |
| after 2 h | 11% |
| Dimensional stability | 1 mm after 236 h. |

EXAMPLE 2

Example 1 is repeated, except that the binder preparation used comprises 2,200 g of 9% strength aqueous solution, adjusted to pH 7.8 with ammonia, of polymer of 60 parts by weight of methyl methacrylate, 10 parts by weight of methyl acrylate, 30 parts by weight of methacrylic acid and an increased proportion (150 g) of kaolin. Flocculation requires 7.6 g of a 10% aqueous solution of a copolymer of 70 parts by weight of acrylamide and 30 parts by weight of diethylaminodiethyl acrylate.

The board thus obtained has the following properties:

| | |
|---|---|
| Binder content (loss on ignition) | 6.7% |
| Density | 0.31 $g/cm^3$ |
| Water uptake after 1 h | 7% |
| after 2 h | 12% |
| Dimensional stability | less than 1 mm after 212 h |

EXAMPLE 3

Example 1 is repeated, except for the following changes: the mineral wool is dispersed in 1,900 g of a 12.5% strength aqueous binder solution, adjusted to pH 8.2 with ammonia, of polymer of 65 parts by weight of methyl methacrylate, 30 parts by weight of methacrylic acid and 52 parts by weight of ethyl methacrylate. No kaolin or flocculant is added.

On testing this board is found to have the following properties:

| Binder content (loss on ignition) | 5.7% |
|---|---|
| Density | 0.23 g/cm$^3$ |
| Water uptake after 1 h | 6.5% |
| after 2 h | 9% |
| Dimensional stability | less than 1 mm after 240 h |

EXAMPLE 4

96 g of fiber material (wood and cellulose fiber) and 24 g of polypropylene fiber are dispersed with thorough stirring in 6 l of water. 24 g of an 8% strength emulsion of stearyldiketene are added with stirring. Once a homogeneous fiber mass is formed (after stirring for 2–4 minutes), 24 g of 40% strength aqueous dispersion of a binder polymer of 60 parts by weight of methyl methacrylate, 30 parts by weight of butyl acrylate and 10 parts by weight of methacrylic acid are added.

25 g of a 10% strength aqueous aluminum sulfate solution are then added with stirring, followed by 4 g of a 10% strength aqueous solution of a copolymer of 70 parts by weight of acrylamide and 30 parts by weight of diethylaminodiethyl acrylate as flocculant. The flocculated slurry is then poured into a sieve box (sieve area 25 cm × 25 cm) and uniformly distributed therein with a wooden spatula. The fiber mass is dewatered under a slightly reduced pressure. A sieve plate (25 cm × 25 cm) is placed on top under slight pressure (less than 0.1 bar) while the slightly reduced pressure is maintained to obtain moist raw plates which on average are about 9 mm in thickness and contain about 40–80% of water. The filtrate can be reused for another experiment.

The raw plates are predried in a microwave oven to a residual moisture content of about 10–15%. The final drying takes place in a hot press at 220° C. under a pressure of 50 kp/cm$^2$ in the course of 90 seconds.

| Density | 0.88 g/cm$^3$ |
|---|---|
| Water uptake after 1 h | 6% |
| after 2 h | 10% |
| Tensile strength | 15 N/mm$^2$ |

EXAMPLE 5

Example 4 is repeated, except that the binder preparation used comprises 32 g of a 30% strength aqueous dispersion of a binder polymer of 70 parts by weight of methyl methacrylate and 30 parts by weight of methacrylic acid.

| Density | 0.81 g/cm$^3$ |
|---|---|
| Water uptake after 1 h | 5% |
| after 2 h | 10% |
| Tensile strength | 12 N/mm$^2$ |

EXAMPLE 6

In a sealed vessel, 50 g of wood fibers are intensively mixed with a stirrer. After about 3–4 minutes of intensive stirring, 19 g of an 8% strength emulsion of stearyldiketene are gradually added with continued at 120° C. in a drying cabinet in the course of about 15 minutes. The dried fiber material is again intensively fluidized and wetted again with 12.5 g of a 30% strength aqueous dispersion of a binder polymer of 60 parts by weight of methyl methacrylate, 30 parts by weight of butyl acrylate and 10 parts by weight of methacrylic acid. The fiber material is dried at 120° C. in a drying cabinet for about 15 minutes and shaped in a mold (20 cm × 20 cm) at 220° C. and 50 kp/cm$^2$ in a hot press in the course of 90 seconds to give fiber boards about 4 mm in thickness.

| Density | 0.93 g/cm$^3$ |
|---|---|
| Water uptake after 1 h | 14% |
| after 2 h | 17% |
| Tensile strength | 15 N/mm$^2$ |

EXAMPLE 7

560 g of a 10% strength aqueous solution, adjusted to pH 8 with ammonia, of a binder polymer of 70 parts by weight of methyl methacrylate and 30 parts by weight of methacrylic acid are stirred with 1,400 g of fire-dried sand. A mold (size 17 cm × 2 cm × 2 cm) is then filled with this mixture, which is then compacted. The method is used to produce a plurality of moldings. They are cured at 180° C. in a drying cabinet in the course of 2 hours.

| Strength | 9 kg/cm$^2$ |
|---|---|

We claim:

1. A process for preparing a stiff mineral fiber board from mineral fibers as an aggregate and an aqueous binder solution at a pH of not less than 7 which contains from 10–25 wt. % of an acrylate polymer, in which the aggregate is moistened with the binder solution, formed into the desired shape and then dried with or without heating, said binder being an acrylate polymer composition whose glass transition temperature is not less than 60° C. and which is formed from: (A) 60–75 percent by weight of methyl methacrylate, (B) 25–35 percent by weight of (meth)acrylic acid, (C) 0–20 percent by weight of a $C_1$–$C_8$-alkyl acrylate, and (D) 0–1 percent by weight of another polymerizable compound.

2. The process of claim 1, wherein said mineral fibers are rock wool, basalt wool, or combinations thereof.

3. The process of claim 1, wherein the fiber board is dried at a temperature of at least 90° C.

4. The process of claim 1, wherein the composition from which the fiber board is prepared contains up to 10 percent by weight of a fire proofing agent.

5. The process of claim 1, wherein said acrylate polymer has a glass transition temperature ranging from 60°–150° C.

* * * * *